(12) United States Patent
Roberson

(10) Patent No.: US 7,278,643 B2
(45) Date of Patent: Oct. 9, 2007

(54) COMPACT CART

(76) Inventor: Steve Roberson, P.O. Box 777, Hazlehurst, GA (US) 31539

( * ) Notice: Subject to any disclaimer, the term of this patent is extended or adjusted under 35 U.S.C. 154(b) by 210 days.

(21) Appl. No.: 10/791,639

(22) Filed: Mar. 1, 2004

(65) Prior Publication Data
US 2005/0189738 A1 Sep. 1, 2005

(51) Int. Cl.
*B62B 1/12* (2006.01)
(52) U.S. Cl. .................. 280/47.18; 280/40; 280/654
(58) Field of Classification Search ............ 280/47.18, 280/47.315, 40, 655, 654, 652
See application file for complete search history.

(56) References Cited

U.S. PATENT DOCUMENTS

| | | | | |
|---|---|---|---|---|
| 785,029 | A * | 3/1905 | Vore | 280/47.3 |
| 1,679,107 | A | 7/1928 | Woldt | |
| 2,716,557 | A | 8/1955 | Gould et al. | 280/34 |
| 2,729,460 | A * | 1/1956 | Forman | 280/40 |
| 3,007,710 | A * | 11/1961 | Sykes | 280/42 |
| RE28,067 | E * | 7/1974 | Hyman | 135/74 |
| 4,040,642 | A * | 8/1977 | David | 280/654 |
| 4,175,769 | A | 11/1979 | Kazmark | 280/654 |
| 4,205,863 | A * | 6/1980 | Walker | 280/652 |
| 4,373,737 | A * | 2/1983 | Cory et al. | 280/30 |
| 4,458,914 | A | 7/1984 | Holtz | 280/654 |
| 4,593,841 | A * | 6/1986 | Lange | 224/153 |
| 4,915,408 | A * | 4/1990 | Clemence et al. | 280/655 |
| 5,127,664 | A * | 7/1992 | Cheng | 280/655 |
| 5,401,043 | A | 3/1995 | Myron | 280/42 |
| 5,549,318 | A | 8/1996 | Ho | 280/654 |
| 6,045,022 | A * | 4/2000 | Giles | 224/532 |
| 6,095,534 | A * | 8/2000 | Wong | 280/42 |
| 6,357,080 | B1 * | 3/2002 | Tsai | 16/113.1 |

* cited by examiner

*Primary Examiner*—Christopher P. Ellis
*Assistant Examiner*—John D Walters
(74) *Attorney, Agent, or Firm*—N. Andrew Crain; Thomas, Kayden, Horstemeyer & Risley

(57) ABSTRACT

A cart for transporting cargo is provided having a first extendable member having a roller coupled to the bottom end of the first extendable member and a connection point on the first extendable member proximate to the roller. The cart also has a second extendable member having a roller coupled to the bottom end of the second extendable member and a connection point on the second extendable member proximate to the roller. The cart has a handle having a linkage that is coupled to the top ends of each of the first and second extendable members. One or more bands may be coupled to the connecting point of the first or second member and to a securing point located at any point between the ends of a member so as to secure the cargo in a position against the first and second members.

7 Claims, 7 Drawing Sheets

COMPACT CART

FIELD OF THE INVENTION

The present invention generally relates to cargo transport, and more particularly to a compact collapsible apparatus and method for transporting cargo and things.

BACKGROUND OF THE INVENTION

Occasions arise when assistance in transporting objects, such as boxes and things, may be more easily accomplished by devices such as dollys and hand trucks. These types of devices increase the load capacity that a typical person can transport in one trip, thereby improving efficiency of the transport process. However, most dollys and hand trucks are large, heavy, and cumbersome, so these types of devices are typically intended for use in a limited area, such as a warehouse, or in association with a delivery truck. By contrast, these types of devices typically are not configured or even suitable for personal transport and use in multiple environments.

For at least that reason (among others), smaller and more portable carts may be better suited for personal use in certain situations, such as airports, office buildings, etc. There, more personalized carts are typically configured with a fold-down ledge or base for holding the cargo against the vertical portion of the cart, which typically includes a handle, upon with the uses pulls or pushes the cart. These types of devices oftentimes also include an extendable handle in the vertical section so that when fully extended and folded-down, the device somewhat resembles the dolly described above.

These smaller types of carts also typically include a matrix of metal frame working and cross members to provide additional support and/or stability to the cart. The additional frame-working and cross members are typically in the plane of the vertical or base sections so that the cart may be collapsed as compactly as possible.

Additionally, these devices typically include a pair of wheels on an axle at or near the center radius of the fold-down base. If not on an axle, the wheels are typically secured to the frame of the device and rely on the other cross-members of the cart to maintain a preconfigured separation between the two separate vertical sides of the cart.

However, even as compactly designed as such carts may be, these carts are still cumbersome and can be difficult to manipulate even in the collapsed position. Based in part on the fixed construction of these types of carts, most designs are collapsible to a size storable in, as a nonlimiting example, an overhead compartment on a commercial airplane. However, even this size means that the cart is essentially a piece of luggage itself even when collapsed. So when the cart is maintained in the collapsed position, the user typically has to carry the cart or place it in larger containers, which oftentimes is not practical or even defeats the purpose of having the cart in the first place.

Therefore, a heretofore unaddressed need exist to overcome the problems and deficiencies described above.

BRIEF DESCRIPTION OF THE DRAWINGS

Many aspects of this invention will be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

A collapsible cart is provided which has two extendable members, each coupled to a handle on one end and to a wheel on the other. A stabilizing member may or may not be included, for in instances without a stabilizing member, the transported cargo may stabilize the cart. A fastener may be used to fasten the cargo to the cart including, but not limited to cord, rope, straps, bolts, clips, Velcro® straps, bungee cords, etc. Any strapping pattern may be used to secure the cargo, including top to bottom and cross strapping. The straps may attach to the extendable members by hooks or ties around the legs or through holes in each member that are spaced to allow for different sizes of cargo.

The cart can be collapsed into a compact configuration by collapsing each of the extendable legs. When fully collapsed, the cart is small and compact and may be stored in a small storage area, such as a handbag, briefcase, or under a vehicle seat, until used.

To facilitate description of the cart, an example apparatus that can be used as a cart is discussed with reference to the figures. Although the apparatus is described in detail, it will be appreciated that this apparatus is provided for purposes of illustration only and that various modifications are feasible without departing from the inventive concept.

Figure 1:
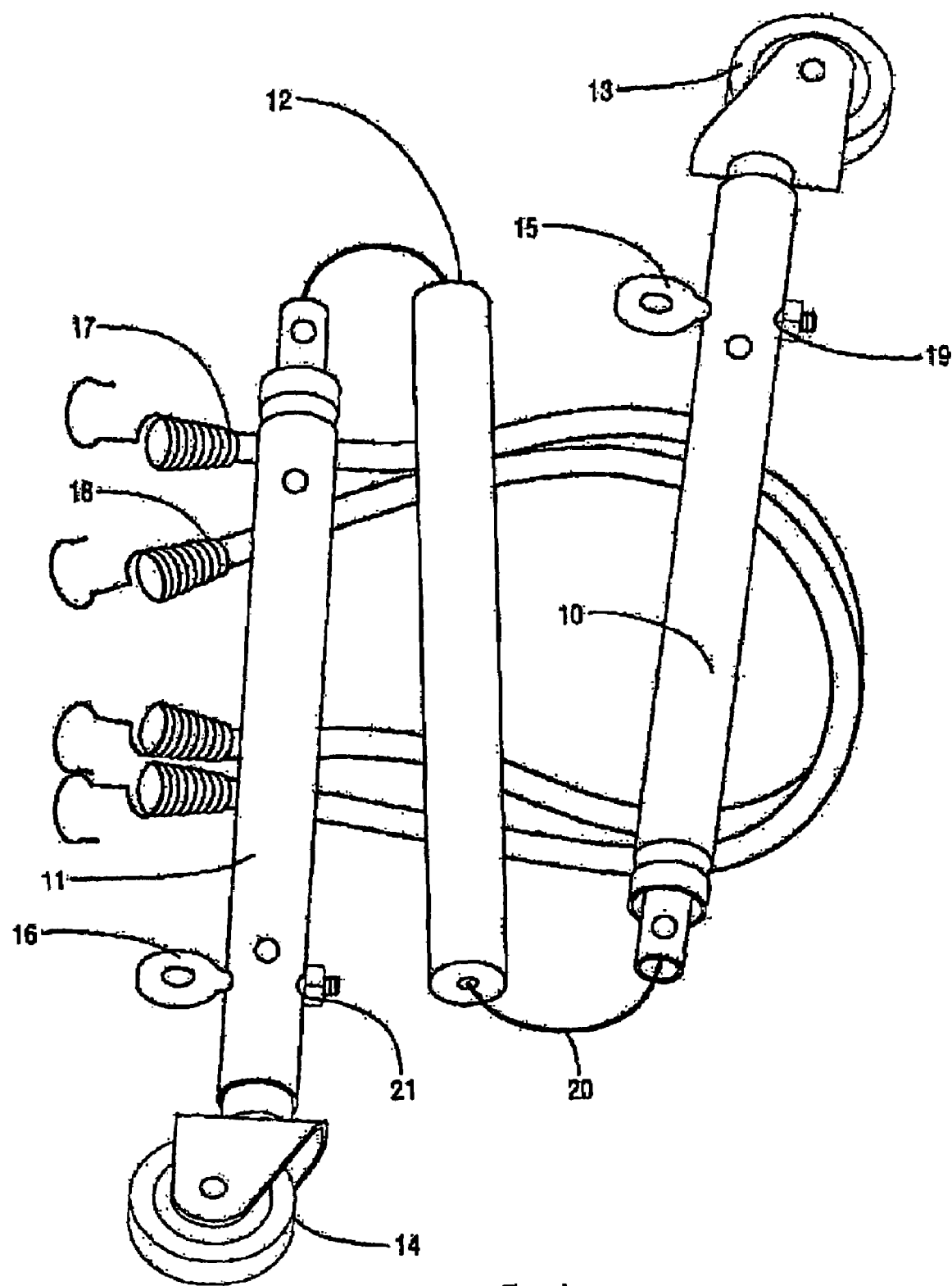
FIG. 1 is a perspective view of the preferred embodiment of the cart in a collapsible position.

Referring now in more detail to the drawings in which like numerals indicate corresponding parts throughout the several views, FIG. 1 is a diagram of the cart 5 in a collapsed position. The cart 5 includes two extendable members 10, 11 which are coupled to a handle 12. One of ordinary skill in the art would recognize that many types of handles could be used such as the tubular handle 12 shown in FIG. 1. But one of ordinary skill would also know that handles of other shapes and sizes would work as well, including, as a nonlimiting example, a knob type of handle. Moreover, any material may be used for the handle 12 including, but not limited to, plastic, molded plastic, metal, wood, or other man-made and natural materials.

For purposes of this disclosure, members 10, 11 may comprise any type of extendable or telescopic leg or rod. While a portion of this disclosure describes and/or depicts members 10, 11 as telescoping members, one of ordinary skill in the art would know that other types of legs and/or rods may be used instead. So this disclosure is not limited to one type of extension member. As a nonlimiting example, extension members 10, 11 may comprise similarly-diametered tubular pieces coupled by a tensioned cord extending through the tubular pieces and attached to the end pieces such that the tubular pieces form a pole when the tension cord is allowed to retract. However, in the nonlimiting embodiment shown in FIG. 1, extendable members 10, 11 are shown as telescoping members.

In FIG. 1, handle 12 is coupled to members 10, 11 via a linkage 20, which as nonlimiting examples, could be rope, cord, chain, wire, rods with connectors (or bolt connector), etc. Regardless of the material used for linkage 20, a flexible connection is established between extendable members 10, 11 and handle 12. As a nonlimiting example, linkage 20 could be configured as a chain-type of linking that allows free flow of movement between the handle and extendable members 10, 11.

For each member 10, 11, the end not connected to the handle 12 is coupled to a wheel 13, 14. However, the rolling mechanism is not limited to wheel implementations. Casters and other such implementations are suitable, as well as one of ordinary skill would know.

Figure 2:
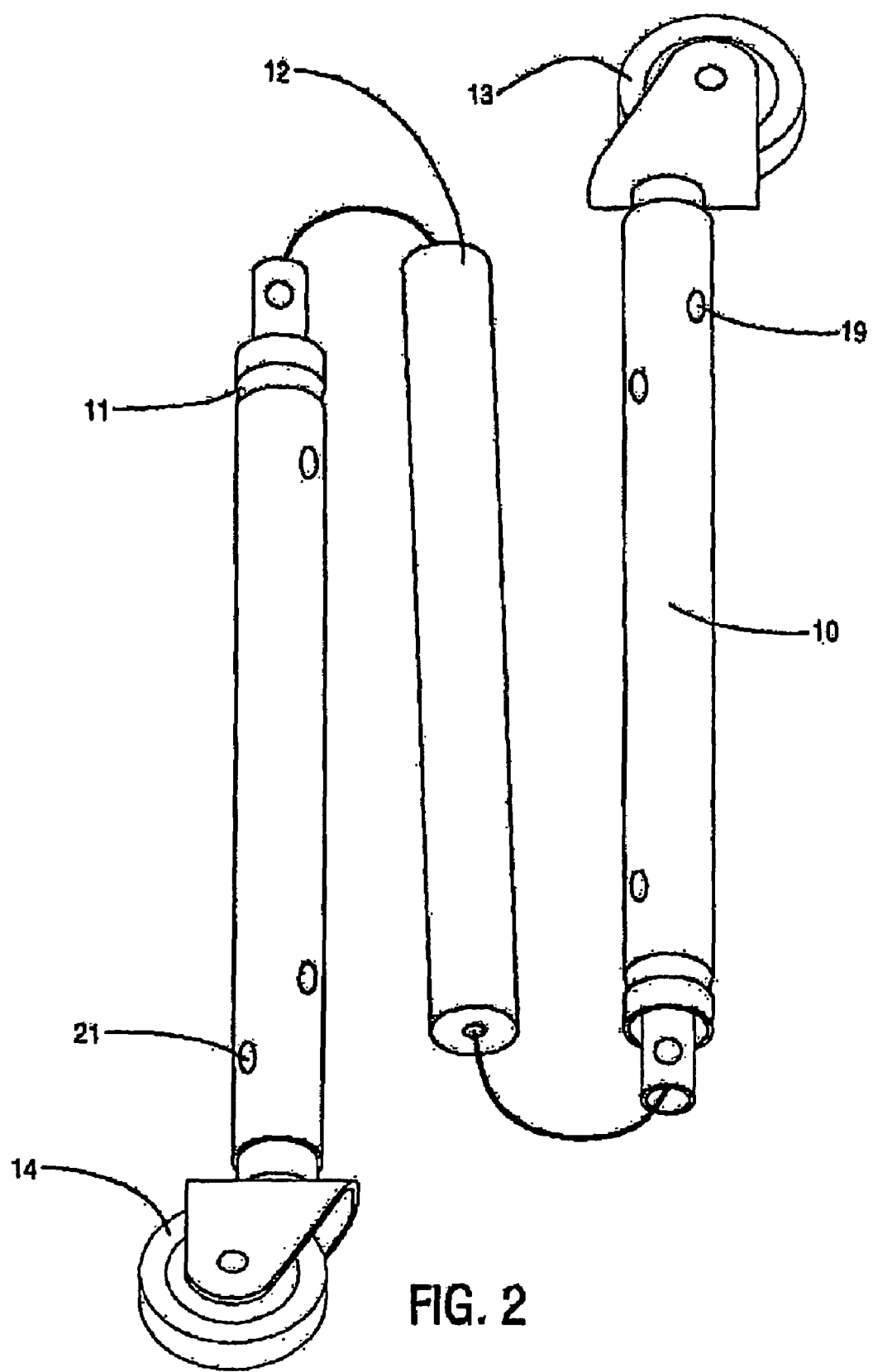
FIG. 2 is a perspective view of the cart in FIG. 1 shown with straps.

In FIG. 2, which is similar to FIG. 1, holes 19, 21 (also shown in FIG. 1) are shown near the end of members 10, 11 proximate to wheels 13, 14. The holes 19, 21 may be used (in the nonlimiting example of FIG. 1) to attach one end of a strap 17, 18. The other end of the strap 17, 18 may be attached to another hole (not shown) placed a distance up the members 10, 11 (when extended) sufficient to fit varying sizes of cargo. One end of the strap 17, 18 may fasten into hole 19, 20, or fasten around a member 10, 11. As one nonlimiting example, strap 17, 18 may be equipped with a hook to secure member 10, 11 at the top holes and also to the bottom holes 19, 21.

Figure 3:
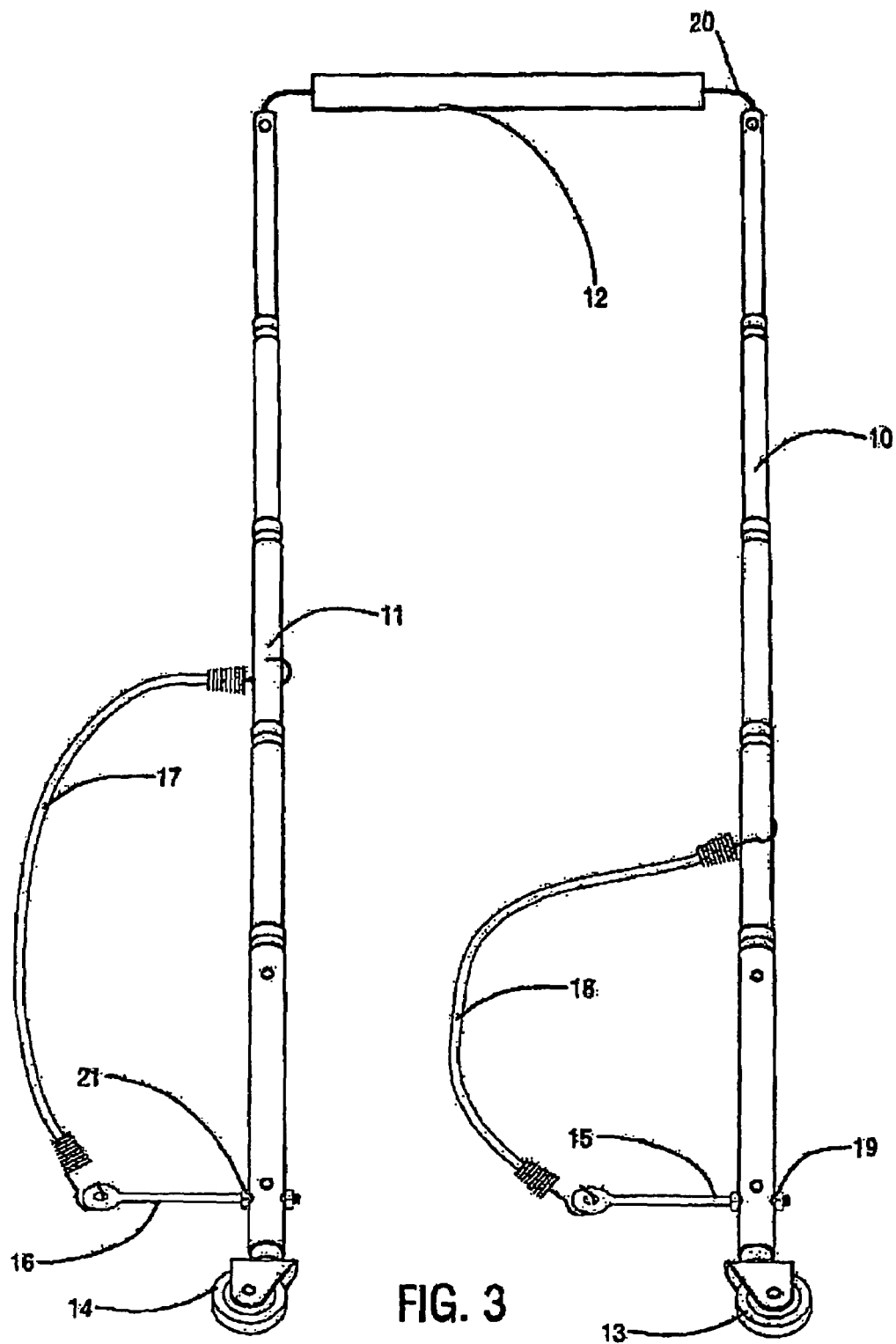
FIG. 3 is a perspective view of the cart in FIG. 2 expanded to an extended position.
Figure 7:
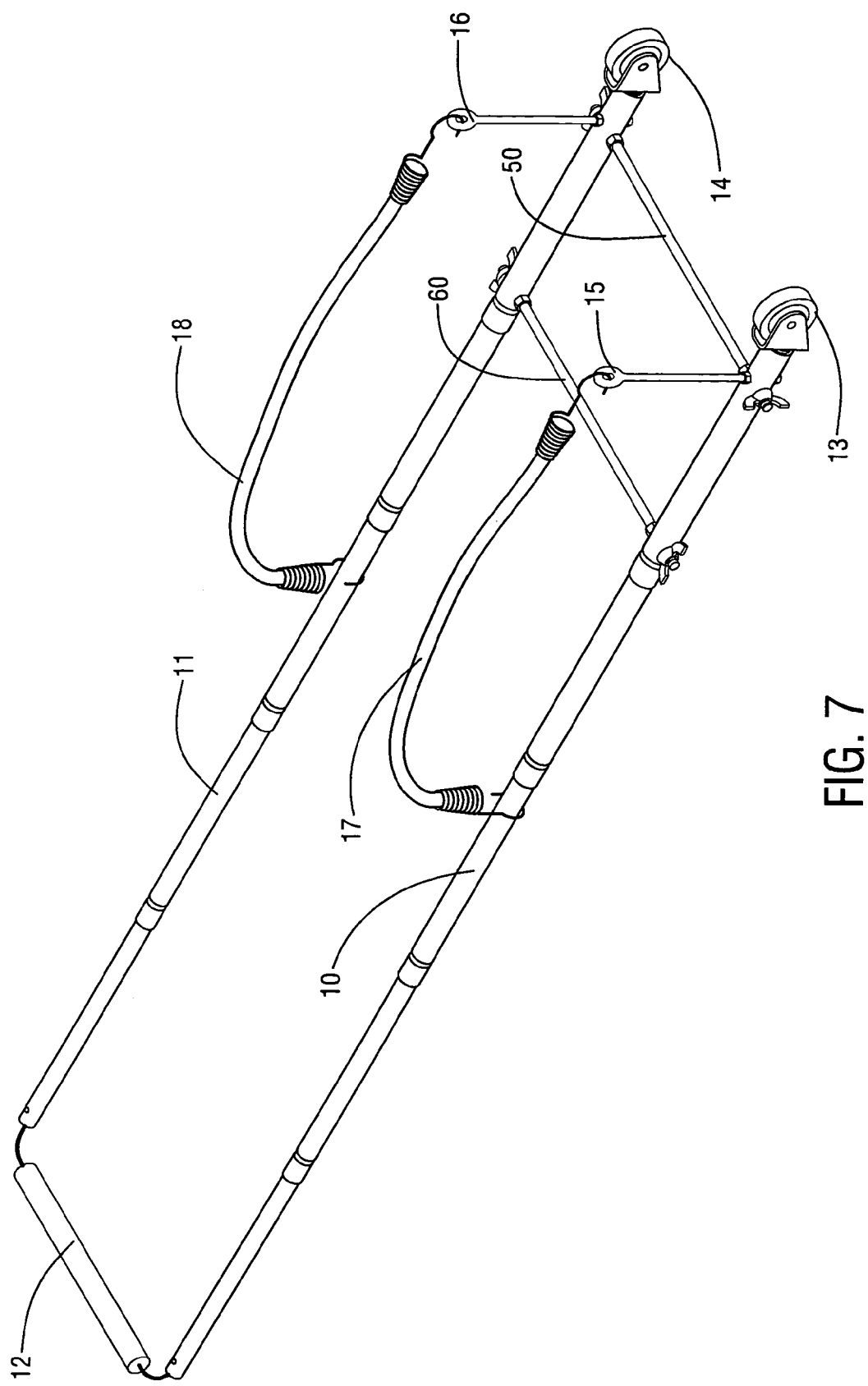
FIG. 7 is a perspective view of the cart in FIG. 6 shown without cargo.

Additionally and as shown in FIG. 2, eyelet bolts 15, 16 may be bolted through the holes 19, 21. The straps 17, 18 can be attached to the eyelets 15, 16 instead of to the holes 19, 20 of members 10, 11. Moreover, the eyelets may be configured a shorter or longer distance from members 10, 11 (as shown in FIGS. 1 and 3) depending on the application. If longer length eyelet is selected, as shown in FIG. 7, the eyelets 15, 16 may operate as supporting ledges of rest for the cargo being transported.

One of ordinary skill would know that eyelets 15, 16 could be any device for coupling to straps 17, 18. As stated above, eyelets 15, 16 can be removed so that straps 17, 18 couple to holes 19, 21 in members 10, 11, respectively.

FIG. 3 demonstrates the cart 5 with the members 10, 11 in an extended position. As a nonlimiting example, extendable members 10, 11 each have five sections, which comprises sections 10a-10e and 11a-11e, respectively. FIG. 3 also demonstrates the extended-length eyelet 15, 16, as described above.

FIG. 3 shows handle 12 coupled to members 10, 11 via linkage 20. As stated above, one of ordinary skill would know that linkage 20 could be any type if linking material, which as non-limiting examples include rope, wire, cable, straps, bands, etc. In the nonlimiting example shown in FIG. 3, linkage 20 passes through a passage in handle 12. One of ordinary skill would also know that additional configurations of the handle 12 and linkage 20 could be implemented to achieve a similar effect. As a nonlimiting example, linkage 20 may be configured as two separate pieces, each coupled to one of the extendable members and then also handle 12.

Sections 10b-10e and 11b-11e are configured to collapse into sections 10a and 11a, respectively, when cart 5 is collapsed. But when extended, each section is configured to slide to a maximum movement position to thereby create the extended extendable member (10 or 11). As a nonlimiting example, the widest diameter of section 10b is wider than the narrowest portion of section 10a, so section 10b is physically prevented from separating from the narrow portion of section 10a. The same is true for sections 10c to 10b, 10d to 10c, and 10e to 10d and also for member 11.

As also shown in FIG. 3, straps 17, 18 may be coupled to eyelets 15, 16 (or holes 19, 21) at a bottom portion. At an upper end, straps may be coupled to members 10, 11 at any point sufficient to hold the cargo in position on the cart 5.

Figure 4:
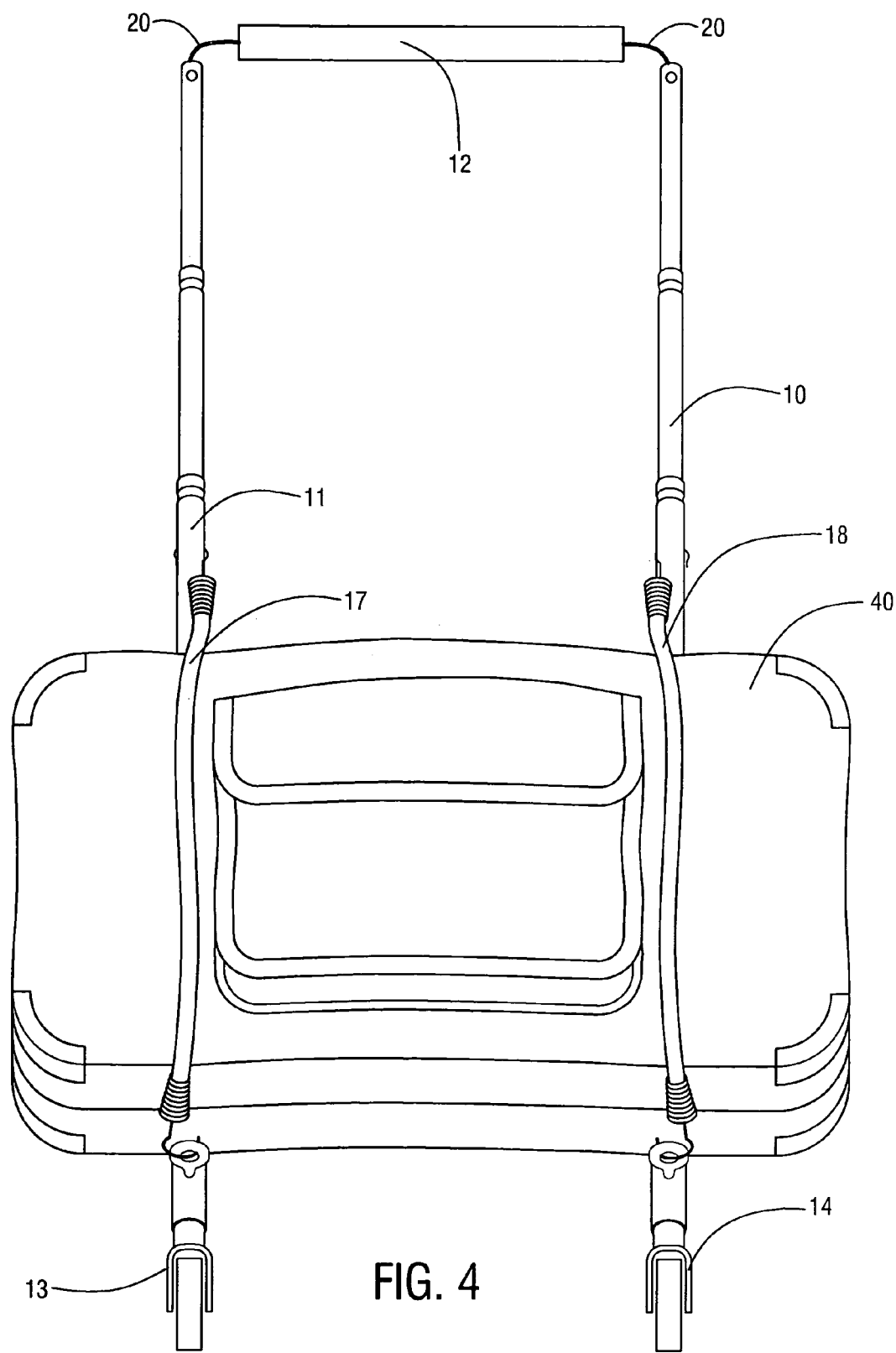
FIG. 4 is a perspective view of the cart in FIG. 3, carrying an object.

FIG. 4 is a diagram depicting the cart 5 in an extended position supporting cargo 40 to be transported. One of ordinary skill in the art will recognize that there are many ways to configure the straps 17, 18 to secure the cargo 40 to the cart. In the non-limiting example shown in FIG. 4, a first strap 17 is attached proximate to the bottom end of a first member 11, routed around the cargo 40 and around the outside of the first member 11. A second strap 18 is attached to the bottom of member 10, routed around the cargo 40 and wrapped around member 11. Strap 18 may be coupled to the second strap 17 if so desired or to tighten the cargo 40 to cart 5. A person of ordinary skill in the art would recognize that there are many ways to secure cargo 40 to the cart 5, based on the size of the cargo 40, the type of means securing the cargo 40 to the cart 5 (i.e., bungee cord, cable, adjustable strap, etc.), and the tension and length of the securing means.

Upon securing cargo 40 to cart 5, a person holding handle 12 can roll cart 5 containing cargo 40 via wheels 13, 14. When held in an upright or angled position, cart 5 may be rolled freely, thereby transporting cargo 5 to a desired location.

Figure 5:
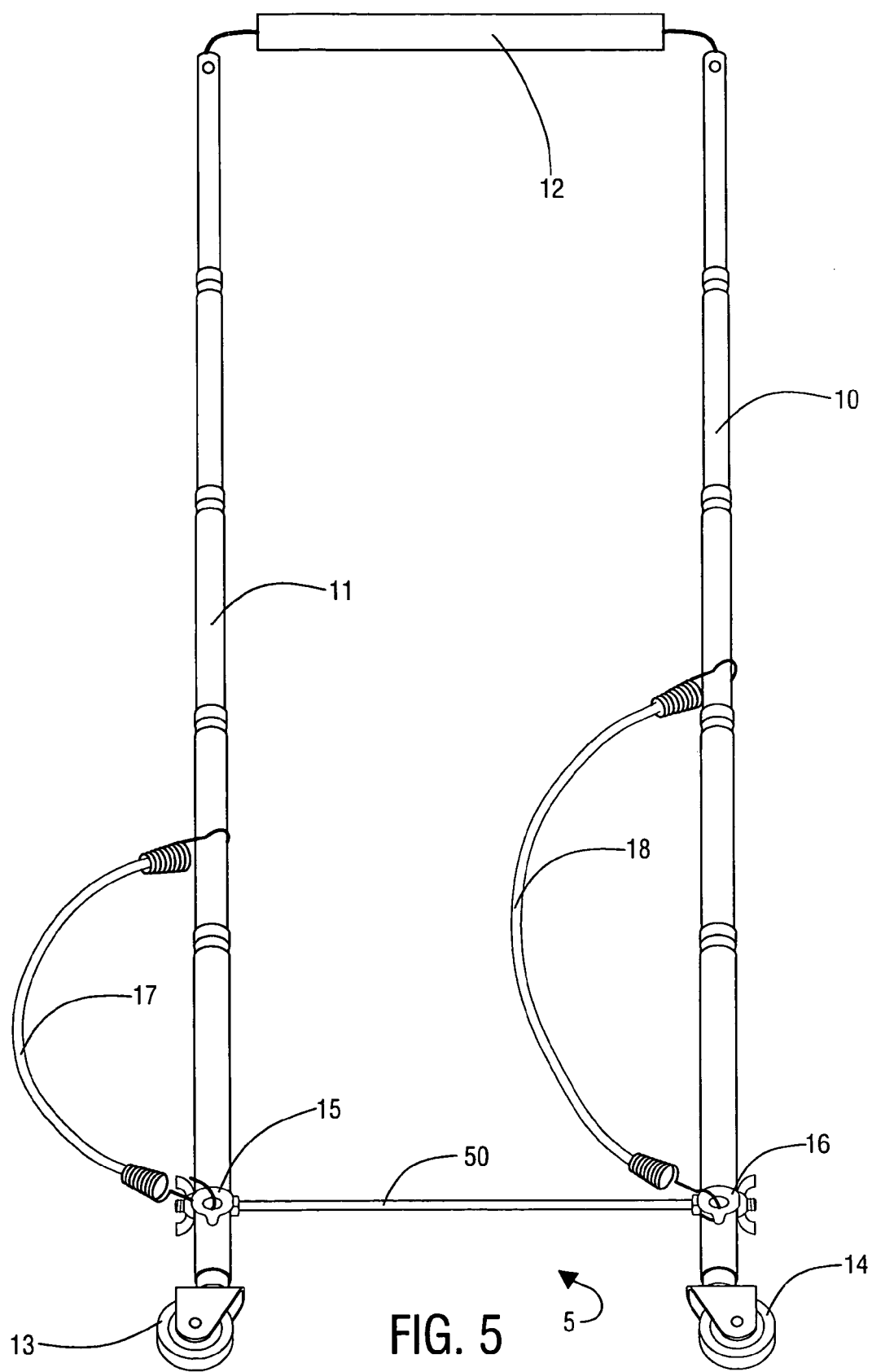
FIG. 5 is a perspective view of the cart in FIG. 3 with a stabilizer bar.

FIG. 5 demonstrates an alternative embodiment of a cart 5 in an extended position with a stabilizer 50 between members 10, 11, proximate to the wheels 13, 14. The stabilizer 50 holds the members 10, 11 in set position so the members 10, 11 do not move toward or away each other during operation. The stabilizer 50 may be permanent to the cart 5 or removable as shown in the nonlimiting example of FIG. 5. In addition, the stabilizer 50 may be set to one length or it may be adjustable.

Figure 6:
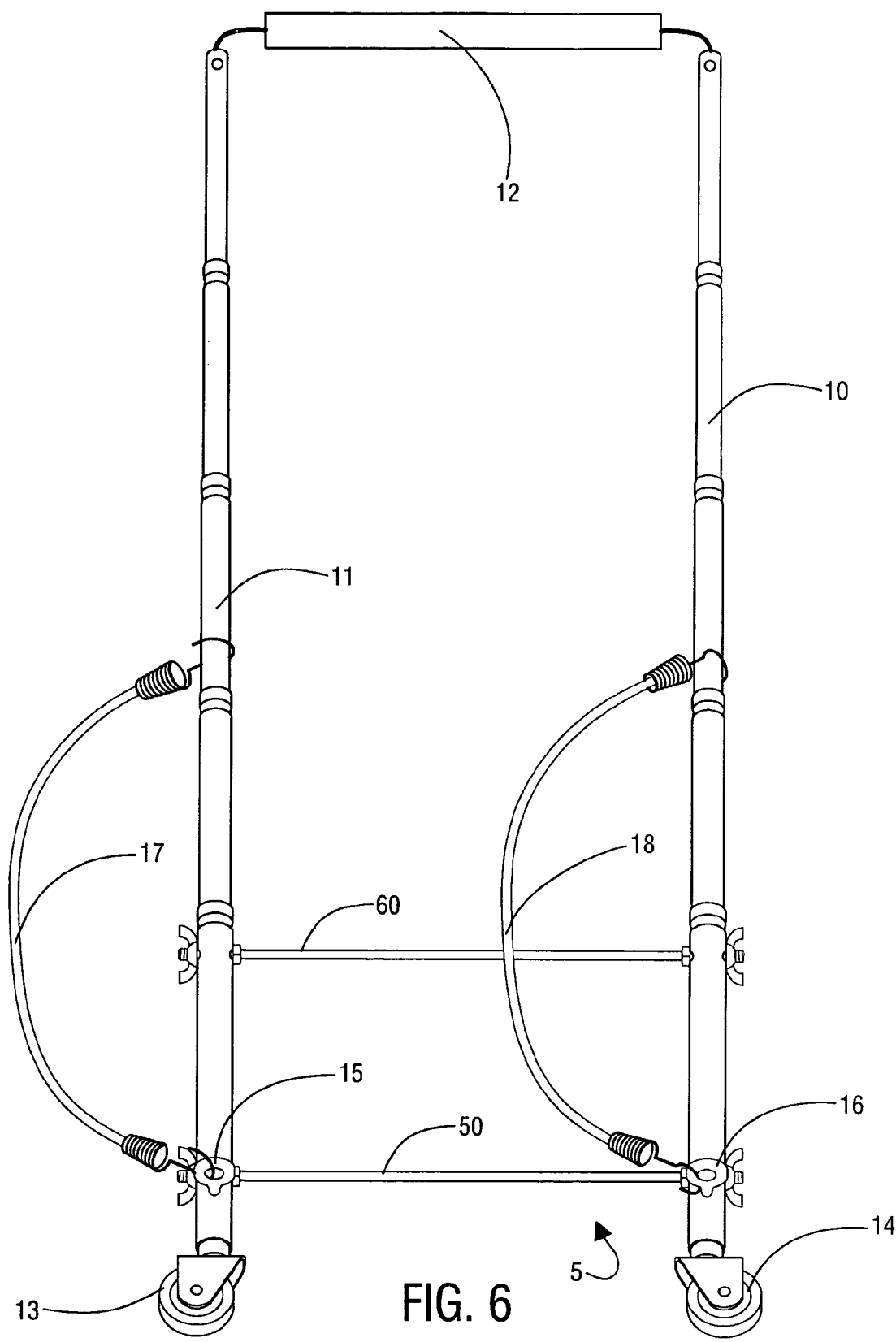
FIG. 6 is a perspective view of the cart in FIG. 5 with an additional stabilizer bar.

FIG. 6 demonstrates an alternative embodiment of a cart 5 with a stabilizer 60 between the members 10, 11, positioned at a distance from the wheels 13, 14 in addition to stabilizer 50. The distance selected may relate to the type and size of cargo to be transported. The stabilizer 60 provides additional support to maintain the relative position of members 10, 11. The stabilizer 60, just like stabilizing 50, may be permanent or removable and may be set to one length or adjustable.

Although stabilizers 50, 60 are shown extending through members 10, 11, one of ordinary skill would know that other stabilization methods may be used. As a nonlimiting example, stabilizers 50, 60 could be configured to snap around the circumference of members 10, 11 instead.

FIG. 7 is a perspective diagram of cart 5 from. FIG. 6 showing cart 5 as configured during transport of cargo. However, in this nonlimiting example, cargo 40 is removed from the diagram to more clearly depict the otherwise obscured aspects of cart 5.

It should be emphasized that the above-described embodiments of the present invention, particularly, any "preferred embodiments, are merely possible examples of implementations, merely set forth for a clear understanding of the principles of the invention. Many variations and modifications may be made to the above-described embodiment(s) of the invention without departing substantially from the spirit of the invention. All such modifications and variations are intended to be included herein within the scope of this disclosure and the present invention and protected by the following claims.

Therefore, having thus described the invention, at least the following is claimed:

1. A cart for transporting cargo, comprising:
    first and second extendable legs, each extendable leg having a roller coupled proximate to a bottom end of the extendable leg;
    a handle coupled to the first extendable leg at a top end of the first extendable leg by a first fastener that permits the handle to pivot in relation to the first extendable leg about the first fastener, and to a second extendable leg at a top end of the second extendable leg by a second fastener that permits the handle to pivot in relation to the second extendable leg about the second fastener, wherein the handle may be pivoted about each of the first and second fasteners into an essentially parallel orientation respective to each of the first and second extendable legs;
    wherein the first and second members lack a fixably coupled member between the first and second members proximate to the bottom end; and
    one or more bands couplable to each of the first or second extendable legs at a first point on each of the first and second extendable legs and to a securing point distally located from the first point on the first or second extendable legs so as to secure the cargo against the first and second extendable legs such that the cargo maintains each of the first and second legs in a relatively fixed position.

2. The cart of claim 1, wherein the first and second fasteners are bolts.

3. The cart of claim 1, wherein the first and second fasteners are rods.

4. The cart of claim 1, wherein the first and second fasteners are rivets.

5. A collapsible cart, comprising,
    first and second extendable legs, each extendable leg having a roller coupled proximate to a bottom end of the extendable leg and wherein the first and second extendable legs lack a member fixably coupled between the first and second extendable legs proximate to the bottom end of each of the first and second extendable legs;
    a handle coupled to the first extendable leg at a top end of the first extendable leg by a first fastener and to a second extendable leg at a top end of the second extendable leg by a second fastener, the first and second fasteners configured so that the handle may be oriented about the first and second fasteners into a position that is substantially parallel to the first extendable leg and into a position that is substantially parallel to the second extendable leg; and
    a securer couplable at a first end of the securer to one of the first and second extendable legs at a first point and couplable at a second end of the securer to one of the first and second extendable legs at a second point so as to secure cargo against both the first and second extendable legs and to maintain a relatively fixed relationship between the first extendable leg to the second extendable leg.

6. The cart of claim 5, wherein the handle is oriented about each of the first and second fasteners into the substantially parallel position respective to each of the first and second extendable legs when the first and second extendable legs are in a retracted position.

7. The cart of claim 5, wherein the handle is oriented about each of the first and second fasteners into the substantially perpendicular position respective to each of the first and second extendable legs when the first and second extendable legs are in an extended position.

* * * * *